No. 780,228.                                                    Patented January 17, 1905.

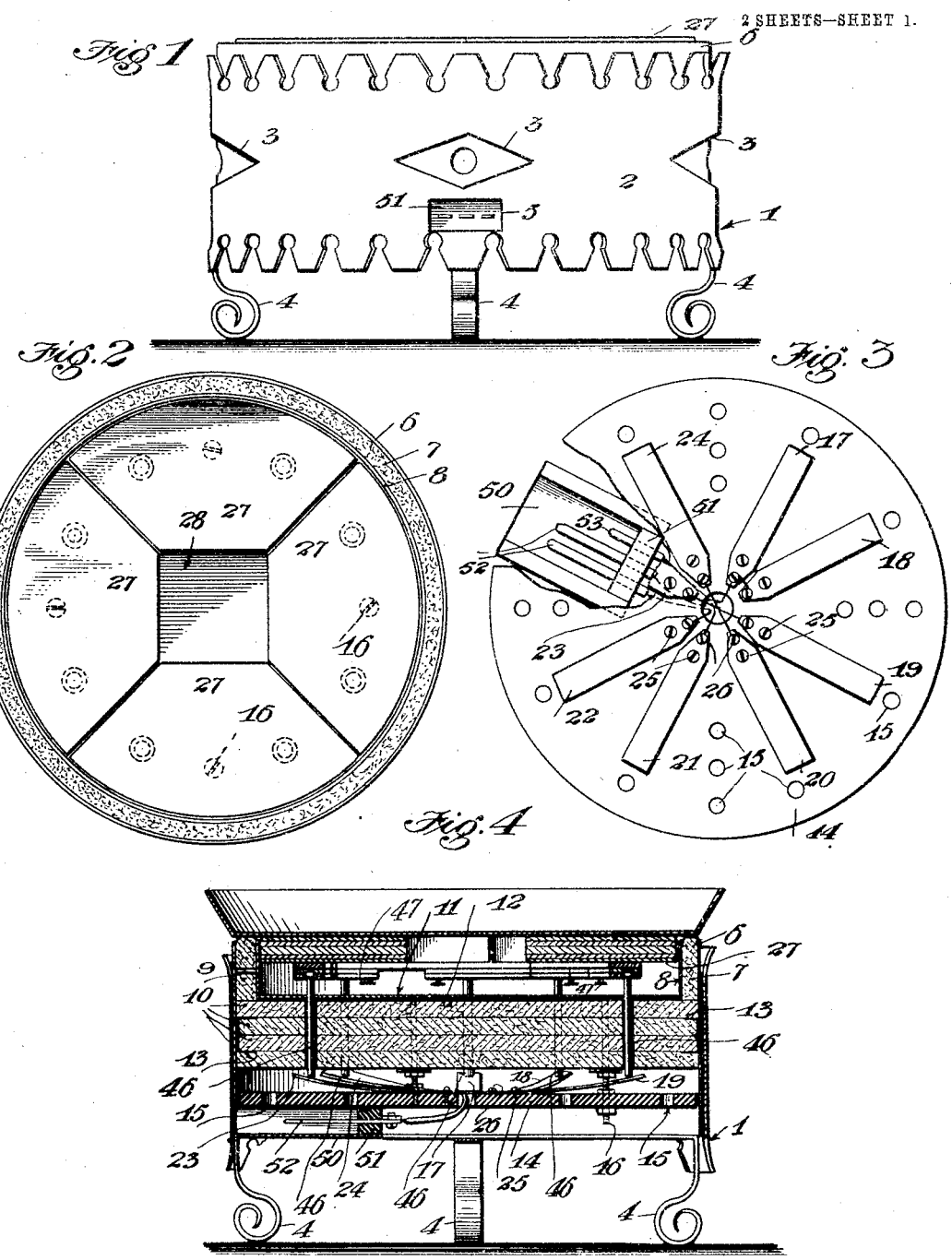

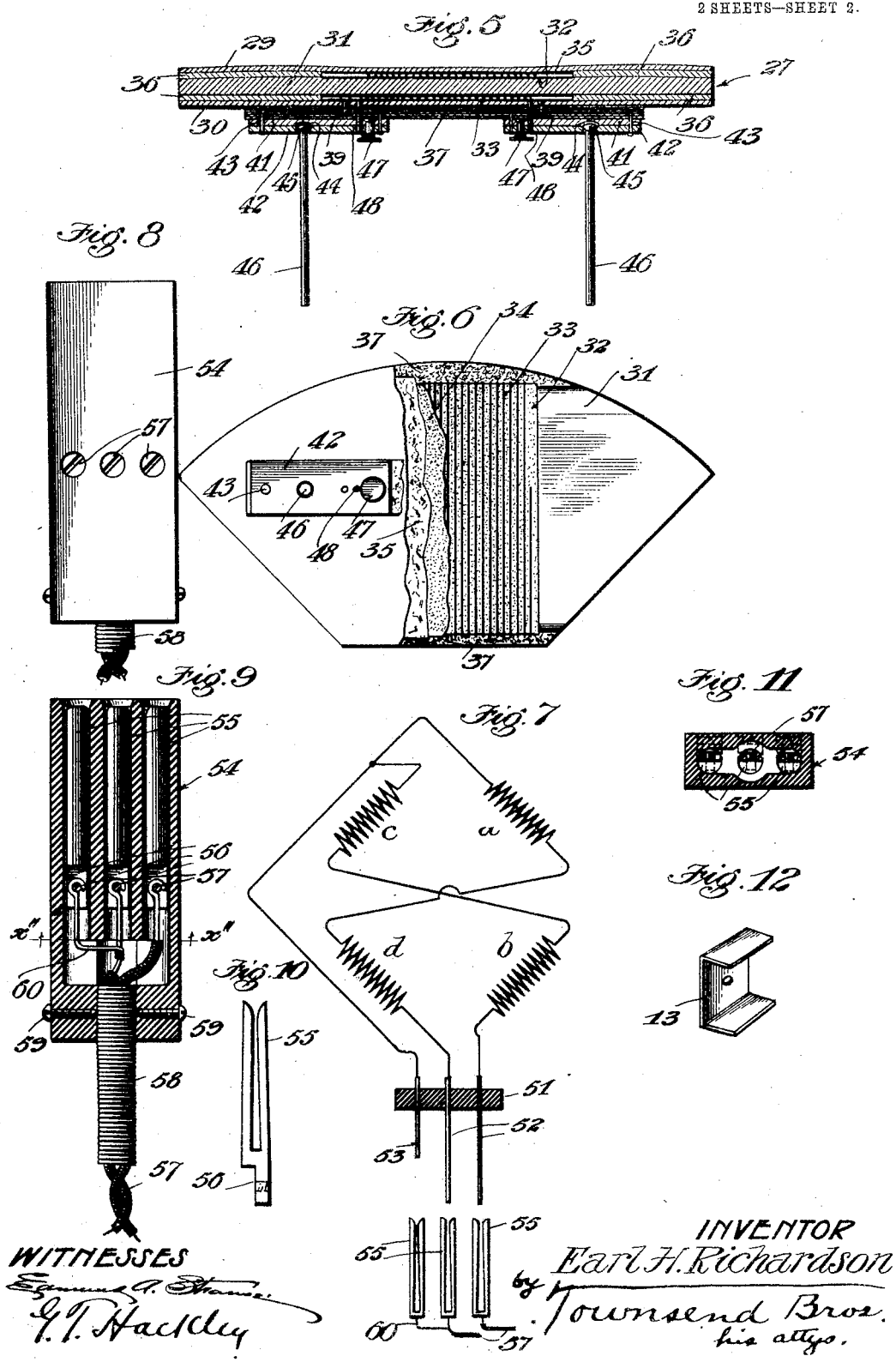

UNITED STATES PATENT OFFICE.

EARL H. RICHARDSON, OF ONTARIO, CALIFORNIA, ASSIGNOR, BY DIRECT AND MESNE ASSIGNMENTS, TO PACIFIC ELECTRIC HEATING COMPANY, OF ONTARIO, CALIFORNIA, A CORPORATION OF CALIFORNIA.

ELECTRIC STOVE.

SPECIFICATION forming part of Letters Patent No. 780,228, dated January 17, 1905.

Application filed January 25, 1904. Serial No. 190,450.

*To all whom it may concern:*

Be it known that I, EARL H. RICHARDSON, a citizen of the United States, residing at Ontario, in the county of San Bernardino and State of California, have invented a new and useful Electric Stove, of which the following is a specification.

This invention relates to that class of stoves in which heat is generated by passing an electric current through resistance-wire.

One object of this invention is to provide for flexibility of that part of the stove which supports the dish or other object to be heated and to employ for this purpose a plurality of contact or heating blocks which are resiliently supported, so that they will accommodate themselves to any unevenness in the bottom of the dish or object.

Another object is to provide means for preventing heat from escaping in any direction except toward the top of the stove. The resiliency of the supporting heat-blocks is such that when the dish or other article to be heated placed upon the supporting-blocks they are depressed by the weight of the dish so that the dish or other object rests upon the rim of the stove, which further confines the heat and prevents escape of heat radially from under the bottom of the dish.

Another object is to provide a novel form of heat-block in which the resistance-wire is arranged and which is so constructed as to take heat from both sides of the resistance-wire, the top plate of the block receiving its heat directly from the wire, while the heat of the top plate of the heat-block is further augmented by receiving heat indirectly by conduction from the bottom plate and core, the ends of the heat-block receiving heat directly from the ends of the core and indirectly from the bottom side of the wire by conduction from the bottom plate, the bottom plate itself receiving heat directly from the bottom faces of the wire.

Another object is to support the heat-blocks in such a manner that when the weight of the dish or other object being heated is removed from the blocks they will assume a position which will cause them to separate slightly from the edges of the stove and form cracks or spaces which allow air to circulate around and under the heat-blocks to prevent excessive heating of the blocks when the dish is off. This is of special value in cases where the dish has been removed and through negligence the current has not been turned off from the heater.

Another object is to construct the heat-blocks in such a manner that a central hole is formed which is adapted to receive a lug on the dish. The lug on the dish serves to hold the dish from displacement on the stove, and the weight of the lug causes a close contact between the dish and heat-blocks to be maintained.

Another object is to provide an adjustable plate underneath to take up any flattening out of the springs which support the heat-blocks.

Another object is to so construct the stove that all the parts are readily removable to allow cleaning of the stove.

When the stove is used for cooking and "boiling over" occurs, the water or mixture readily runs down through the stove and away, so that there is no chance for the stove to become unclean or clogged up by accumulations due to accident or negligence.

Another object is to provide for a ready removal of the body of the stove from the base.

Another object is to so construct the parts of the stove that overheating of the springs which support the heat-blocks is avoided.

Another object is to provide a novel form of heat-block so designed that when a dish or other object is placed upon the block there will be at least two points of contact even though the dish or other object has an uneven bottom, and to make each heater-block compact and impervious to moisture, the wire and core being perfectly housed therein, and thus protected from any possible tampering.

Owing to the novel construction employed, the heat does not pass downward, and, further, as the stove is raised somewhat it can be used with safety on top of a polished table, if desired.

Another object is to provide a novel switch-plug and connections by means of which three degrees of heat may be obtained.

Other objects and advantages of the invention will appear from the following description.

The accompanying drawings illustrate the invention, and referring to the same—

Figure 1 is a side elevation of the stove. Fig. 2 is a plan view of the same. Fig. 3 is a plan view of the spring-supporting plate. Fig. 4 is a vertical section taken diametrically through the stove. Fig. 5 is a section taken longitudinally through a heater-block. Fig. 6 is a view looking toward the bottom of a heater-block with successive layers which form the plate removed to show underlying features. Fig. 7 is a diagram showing the connections of the heater-blocks and switch-plug. Fig. 8 is a plan view of the switch-plug. Fig. 9 is a longitudinal section through the switch-plug. Fig. 10 is a detail of a split tongue. Fig. 11 is a cross-section through the switch-plug on line X″ X″, Fig. 9. Fig. 12 is a perspective of a supporting-clip.

1 designates the base, which comprises a circular band 2, the upper and lower edges of which may be notched in fanciful design, as shown, and the center of the band may have diamond-shaped openings 3. Legs 4 are provided for supporting the base 1. The band 2 is also provided with a rectangular opening 5 for the introduction of the switch-plug.

6 designates an inner band, preferably of aluminium, around the upper inner periphery of which is arranged an annular ring of asbestos 7, the asbestos projecting a trifle above the rim of the band, as shown. Inside the ring of asbestos is a ring or band of aluminium 8, which holds the asbestos in shape and which may be fastened to the band 6 by rivets 9, as shown.

Several layers or disks of asbestos 10 are arranged within the band 6 below the ring 7. In the present embodiment four asbestos disks are shown. A disk of aluminium 11 is arranged above the upper asbestos disk 10, there being a layer of mica 12 introduced between the disk 11 and top disk 10. A series of U-shaped clips 13 are riveted to the band 6 and serve to support the layers of asbestos 10. The clips are shown as embracing the two central layers of asbestos.

14 is a spring-supporting disk formed, preferably, of hard fiber, which is arranged within the band 6 a short distance below the bottom layer of asbestos 10. The disk 14 is provided with several perforations 15 for the purpose of allowing air to enter the space between the fiber disk and the asbestos. The disk 14 is supported by bolts 16, which pass through the layers of asbestos 10 and aluminium disk 11, four bolts equally spaced sufficing for the purpose.

Spring-fingers 17 to 24, inclusive, formed, preferably, of brass, are fastened to the fiber disk 14 and arranged radially, as shown, by screws 25 and 26. A series of four segmental heat-blocks 27 is provided, and the heat-blocks are resiliently supported to form the upper face of the stove. By referring to Fig. 2 it will be seen that the heat-blocks are so formed as to provide a square opening 28 at the center of the stove. Each heat-block comprises a top plate 29 and a bottom plate 30. A core 31 is located between the top and bottom plates and is similar in outline except that its opposite sides are parallel and somewhat narrower than the top and bottom plates 29 and 30, and around the core is wound a layer of mica 32. Upon the mica is wound resistance-wire 33, and the coils of the wire 33 are spaced carefully apart, so that short-circuiting is avoided. After winding the wire on the core fire-clay 34 is plastered over the wire to fill the spaces between the wire and a scraper is passed over the face of the wire to remove the excess of fire-clay, thus embedding the coils of wire in fire-clay and preventing any possible short-circuiting. The wire and fire-clay are then covered by a sheathing of mica 35.

It should be observed that the inner and outer layers of mica extend over the core a distance only sufficient to embrace the wiring, thus leaving the ends of the core exposed. In order to build up the ends of the core and bring them flush with the thickness caused by the wire winding and mica layers, plates 36 are employed, one on each side of the core at both ends of the core. The parts of the body of the core, as before described, are all made, preferably, of brass, with the exception, of course, of the mica layers and wire. In order to fill the spaces between the top and bottom plates 29 and 30 at each side of the core and to protect and cover the edges of the core, asbestos 37 is introduced.

Rectangular strips of mica 37 are arranged next to the bottom plate 30, the strips being fastened to the bottom plate 30 by rivets 39. At each end of the strips are arranged two blocks 41 and 42.

The blocks 41 and 42 are fastened to the superposed strips 37 by means of rivets 43. It will be seen that the blocks 41 and 42 are perfectly insulated from the bottom plate 30, as the rivets 43 pass only through a few of the lower mica strips and the rivets 39 pass only through the upper strips.

The blocks 41 and 42 are each provided with a central recess 44, which loosely receives the head 45 of a supporting-post 46. The shank of the post 46 passes loosely through the bottom block 42, as the hole in the latter is somewhat larger than the post 46, so that the posts 46 have a considerable flexibility with respect to the heat-blocks which they support.

Binding-posts 47 are provided in each set of blocks 41 and 42, and the respective ends of the resistance-wire 33 of the core are fastened to the respective binding-posts 47, passing through holes 48, formed through all of the layers of mica and asbestos and blocks 41 and 42. Thus the two posts 46 form terminals for each heat-block.

The posts 46 of each heat-block pass through holes in the disks of asbestos 10 and aluminium disk 11, and the ends of the posts 46 are supported by the spring-fingers 17 to 24.

The holes in the aluminium disk are somewhat larger than the posts 46 in order to prevent contact between the aluminium disk and post, and the mica layer is drilled with holes to closely fit the posts 46 to prevent tearing or abrasion of the asbestos, which might occur when the posts 46 were slipped down through the holes in placing the heat-blocks in the stove and the edges of the holes through the asbestos were unprotected.

Screwed to the under face of the fiber disk 14 is a switch-plug receptacle 50, and 51 is a block of insulating material in one end of the receptacle and provided with three tongues 52, 52, and 53, the tongue 53 being much shorter than the two tongues 52, which latter are of equal length.

The spring-fingers 18 and 19 form terminals for one heat-block, the resistance of which is designated $a$ in Fig. 7. The spring-fingers 20 and 21 form terminals for another heat-block, the resistance of which is designated $b$. The spring-fingers 22 and 23 form terminals for another heat-block, the resistance of which is designated $c$, while the spring-fingers 24 and 17 form terminals for the fourth heat-block, the resistance of which is designated $d$. When the heat-blocks all rest properly on their spring-fingers, the connections are as shown in Fig. 7.

54 is an oblong block formed, preferably, of hard fiber, which is provided with three split tongues 55. Each tongue 55 has a flattened end 56, and screws pass laterally through the block 54 and into the respective flattened ends of the split tongues 55 and serve the double function of holding the split tongues in place in the block and also as attaching-posts for the conducting-wires.

The two conducting-wires 57 are twisted where they pass through the end of the block 54 and are guarded by a coiled spring 58, which is confined in place by set-screws 59. The wires 57 where they emerge from the coil-spring 58 are spread, and one wire 57 is connected to two of the split tongues 55, a branch wire 60 being employed, while the other wire 57 connects to only one of the split tongues 55, as shown in Fig. 9.

In order to give at least two points of contact between each heat-block and the dish or other object which may rest upon it, I curve the block slightly, as shown in Fig. 5.

In practice I have found that it is preferable to curve the heat-blocks so that the upper face of each block presents two convex faces between which is a concave face. Even though the heat-block were made perfectly flat on top and the bottom of the dish or other object were perfectly flat such conditions do not continue, as in use the bottom of the dish becomes warped or dented, which results in usually only one point of contact between dish and heat-block. By providing the curved face as explained I have found in actual practice that it results in getting a better contact between blocks and dish—i. e., that there are more points of contact generally on the stove—than by attempting to make perfectly flat contact.

By the manner of wiring the respective heat-blocks and contact-blades and making the contact-blades of unequal length, as shown, three degrees of heat many be obtained. The low heat is produced by pushing the switch-plug into the receptacle, so that only two of its tongues $i\,j$ make contact with two of the blades $f\,g$, which connects the resistance $a\,b\,c\,d$ in series. The medium heat is produced by pushing the plug clear in, so that tongues $h\,i\,j$ contact with blades $e\,f\,g$, which cuts out one-half the resistance, the circuit then being through tongue $j$, blade $g$, resistance $b$ and $d$, blade $e$, and tongue $h$, while by turning over and reversing the plug, so that tongues $j$, $i$, and $h$ are in contact with blades $e$, $f$, and $g$, respectively, a series-parallel circuit is produced giving the greatest heat, the two tongues $h$ and $i$ both supplying current to the blades $f$ and $g$.

The screws on the plug may serve as marks for registering with the side face of the stove to indicate that the connection is made for the low heat, while when the plug is pushed farther and is clear in the medium heat is produced. Manifestly when the plug is turned over and the screws are not visible the plug will naturally be pushed in as far as it will go, which will give the maximum heat.

What I claim is—

1. In an electric stove, a heat-insulating material disposed in cup form, a heat-block in the space, the face of the heat-block being so curved as to present at least two points of contact, and resistance in the heat-block.

2. In an electric stove, a heat-insulating material disposed in cup form, a heat-block in the space, resistance in the heat-block, and means for resiliently and flexibly supporting the heat-block whereby an air-space is formed around the heat-block when not under a weight, and whereby the air-space is contracted or closed when the heat-block sustains a weight.

3. In an electric stove, a plurality of heat-blocks, and means for resiliently supporting the heat-blocks.

4. In an electric stove, a plurality of heat-blocks, and means for resiliently and flexibly supporting the heat-blocks to allow the heat-blocks to adjust themselves to an uneven surface.

5. In an electric stove, a plurality of heat-blocks, means for resiliently supporting the heat-blocks, and a non-heat-conducting material around and under the heat-blocks.

6. In an electric stove, a plurality of heat-blocks, means for resiliently and flexibly supporting the heat-blocks to allow the heat-blocks to adjust themselves to an uneven surface, and a non-heat-conducting material around and under the heat-blocks.

7. In an electric stove, a circular cupped base, a plurality of segmental heat-blocks arranged therein, and means for supporting the same.

8. In an electric stove, a plurality of exposed heat-blocks, and means for supporting the same, said heat-blocks being unattached to the supporting means.

9. In an electric stove, a heat-block, resistance-wire therein, means for resiliently supporting the heat-block and for conducting current to the heat-block.

10. In an electric stove, a plurality of heat-blocks, and means for resiliently supporting the heat-blocks independently and for conducting current to the heat-blocks.

11. In an electric stove, a heat-block, resistance therein, terminals for the heat-block, and springs of conducting material upon which the terminals rest.

12. In an electric stove, a plurality of heat-blocks, resistance therein, terminals for the heat-blocks, and springs of conducting material upon which the terminals rest.

13. In an electric stove, a circular cupped base, a plurality of segmental heat-blocks arranged therein, means for supporting the same, and a non-heat-conducting material around and under the heat-blocks.

14. In an electric stove, a plurality of exposed heat-blocks, means for supporting the same, said heat-blocks being unattached to the supporting means, and a non-heat-conducting material around and under the heat-blocks.

15. In an electric stove, a heat-block, resistance-wire therein, means for resiliently supporting the heat-block and for conducting current to the heat-block, and a non-heat-conducting material around and under the heat-blocks.

16. In an electric stove, a plurality of heat-blocks, means for resiliently supporting the heat-blocks independently and for conducting current to the heat-blocks, and a non-heat-conducting material around and under the heat-blocks.

17. In an electric stove, a heat-block, resistance therein, terminals for the heat-block, springs of conducting material upon which the terminals rest, and a non-heat-conducting material around and under the heat-blocks and above the springs.

18. In an electric stove, heat-blocks, a non-heat-conducting material around and under the heat-blocks, a spring-supporting plate under the non-heat-conducting material, springs on said plate, and posts for the heat-blocks extending through the non-heat-conducting material and resting upon the springs.

19. In an electric stove, heat-blocks, a non-heat-conducting material around and under the heat-blocks, a spring-supporting plate under the non-heat-conducting material, springs of conducting material on said plate, and posts forming terminals for the heat-blocks extending through the non-heat-conducting material and resting upon the springs.

20. In an electric stove, heat-blocks, a non-heat-conducting material around and under the heat-blocks, a spring-supporting plate under the non-heat-conducting material, springs on said plate, posts for the heat-blocks extending through the non-heat-conducting material and resting upon the springs, and a band encompassing the non-heat-conducting material, its upper edge being slightly below the non-heat-conducting material.

21. In an electric stove, heat-blocks, a non-heat-conducting material around and under the heat-blocks, a spring-supporting plate under the non-heat-conducting material, springs on said plate, posts for the heat-blocks extending through the non-heat-conducting material and resting upon the springs, a band encompassing the non-heat-conducting material, and U-clips on the band for supporting the non-heat-conducting material.

22. In an electric stove, heat-blocks, a non-heat-conducting material around and under the heat-blocks, a spring-supporting plate under the non-heat-conducting material, springs on said plate, posts for the heat-blocks extending through the non-heat-conducting material and resting upon the springs, a band girdling the non-heat-conducting material, and a circular base in which the band is nested.

23. In an electric stove, heat-blocks, posts flexibly attached to the heat-blocks, asbestos under the heat-blocks, a plate of non-conducting material, bolts extending through the asbestos and supporting the plate, springs of conducting material on the plate, said posts extending through the asbestos and resting upon the springs.

24. In an electric stove, heat-blocks, posts flexibly attached to the heat-blocks, asbestos under the heat-blocks, a plate of non-conducting material, bolts extending through the asbestos and supporting the plate, springs of conducting material on the plate, said posts extending through the asbestos and resting upon the springs, and a plate of insulating material over the asbestos having holes through which the posts pass for guarding the edges of the holes in the asbestos.

25. In an electric stove, heat-blocks, posts flexibly attached to the heat-blocks, asbestos under the heat-blocks, a plate of non-conducting material, bolts extending through the asbestos and supporting the plate, springs of conducting material on the plate, said posts extending through the asbestos and resting upon the springs, a plate of insulating material over the asbestos having holes through which the posts pass for guarding the edges of the holes in the asbestos, and a metallic plate above the latter plate and having holes larger than the posts to prevent contact with the posts.

26. In an electric stove, heat-blocks, a non-heat-conducting material around and under the heat-blocks, a spring-supporting plate under the non-heat-conducting material, springs on said plate, posts for the heat-blocks extending through the non-heat-conducting material and resting upon the springs, a band encompassing the non-heat-conducting material, and having air-holes for ventilating the springs.

27. In an electric stove, heat-blocks, a non-heat-conducting material around and under the heat-blocks, a spring-supporting plate under the non-heat-conducting material, springs on said plate, posts for the heat-blocks extending through the non-heat-conducting material and resting upon the springs, said spring-supporting plate having air-holes for ventilating the springs.

28. In an electric stove, heat-blocks, a non-heat-conducting material around and under the heat-blocks, a spring-supporting plate under the non-heat-conducting material, springs on said plate, posts for the heat-blocks extending through the non-heat-conducting material and resting upon the springs, a band girdling the non-heat-conducting material, and a circular base in which the band is nested, said base having air-holes, and said band having air-holes registering with the holes in the base for ventilating the springs.

29. In an electric stove, an exposed heat-block comprising top and bottom plates, a core between said plates, and resistance-wire wound on the core.

30. In an electric stove, a heat-block comprising top and bottom plates, a core between said plates, resistance-wire wound on the core, the ends of the core protruding beyond the wire, and means for securing a solid contact between the protruding ends of the core and the top and bottom plates to promote conduction of heat.

31. In an electric stove, a heat-block comprising top and bottom plates, a core between the plates, mica on the core, wire wound over the mica, refractory material embedding the wire, mica over the wire, the ends of the core protruding from the mica, and means for securing a solid contact between the protruding ends of the core and the top and bottom plates for promoting the conduction of heat.

32. In an electric stove, a heat-block comprising top and bottom plates, a core between the plates, mica on the core, wire wound over the mica, refractory material embedding the wire, mica over the wire, the ends of the core protruding from the mica, means for securing a solid contact between the protruding ends of the core and the top and bottom plates for promoting conduction of heat, the top and bottom plates being wider than the core, and a filling of asbestos adjacent the edges of the core.

33. In an electric stove, a heat-block comprising top and bottom plates, a core between said plates, resistance-wire wound on the core, and posts flexibly connected to the bottom plate and forming terminals for the wire.

34. In an electric stove, a heat-block comprising top and bottom plates, a core between said plates, resistance-wire wound on the core, the ends of the core protruding beyond the wire, means for securing a solid contact between the protruding ends of the core and the top and bottom plates to promote conduction of heat, and posts flexibly connected to the bottom plate and electrically connected to the wire but insulated from the bottom plate.

35. In an electric stove, a heat-block comprising top and bottom plates, a core between said plates, resistance-wire wound on the core, the ends of the core protruding beyond the wire, means for securing a solid contact between the protruding ends of the core and the top and bottom plates to promote conduction of heat, insulating material attached to the bottom plate, blocks attached to the insulating material, and posts forming terminals for the wire, said blocks having recesses for receiving heads on the posts.

36. In an electric stove, a plurality of contact-blades, resistance-coils connected in series between two of said blades, and a third blade having a shunt connection from the series circuit whereby part of the resistance may be cut out.

37. In an electric stove, a plurality of contact-blades, resistance-coils connected in series between two of said blades, and a third blade having a shunt connection from the series circuit whereby part of the resistance may be cut out, said third blade being of a different length from the other blades.

38. In an electric stove, a plurality of contact-blades, resistance-coils connected in series between two of said blades, and a third blade having a shunt connection from the series circuit whereby part of the resistance may be cut out, said third blade being of a different length from the other blades, in combination with a plug having a plurality of tongues of equal length, a feed-wire, one lead of which is connected to two of said tongues, and the other lead being connected to another tongue.

39. In an electric stove, a base, a band removably held in said base, asbestos disks supported by said band, an annular asbestos ring inside the band, a plurality of segmental heat-blocks, means for flexibly supporting the heat-blocks out of balance to form air-spaces when they sustain no weight.

40. In an electric stove, a base, a band removably held in said base, asbestos disks supported by said band, an annular asbestos ring inside the band, a plurality of segmental heat-blocks, means for flexibly supporting the heat-blocks out of balance to form air-spaces when they sustain no weight, said heat-blocks being formed to provide a central opening for promoting ventilation or for receiving a lug on the dish being heated.

In testimony whereof I have hereunto signed my name, in the presence of two subscribing witnesses, at Los Angeles, in the county of Los Angeles and State of California, this 18th day of January, 1904.

EARL H. RICHARDSON.

Witnesses:
GEORGE T. HACKLEY,
JULIA TOWNSEND.